May 24, 1960
L. H. HAWTHORNE
2,938,106
WELDING GUNS
Filed Nov. 14, 1957
5 Sheets-Sheet 2
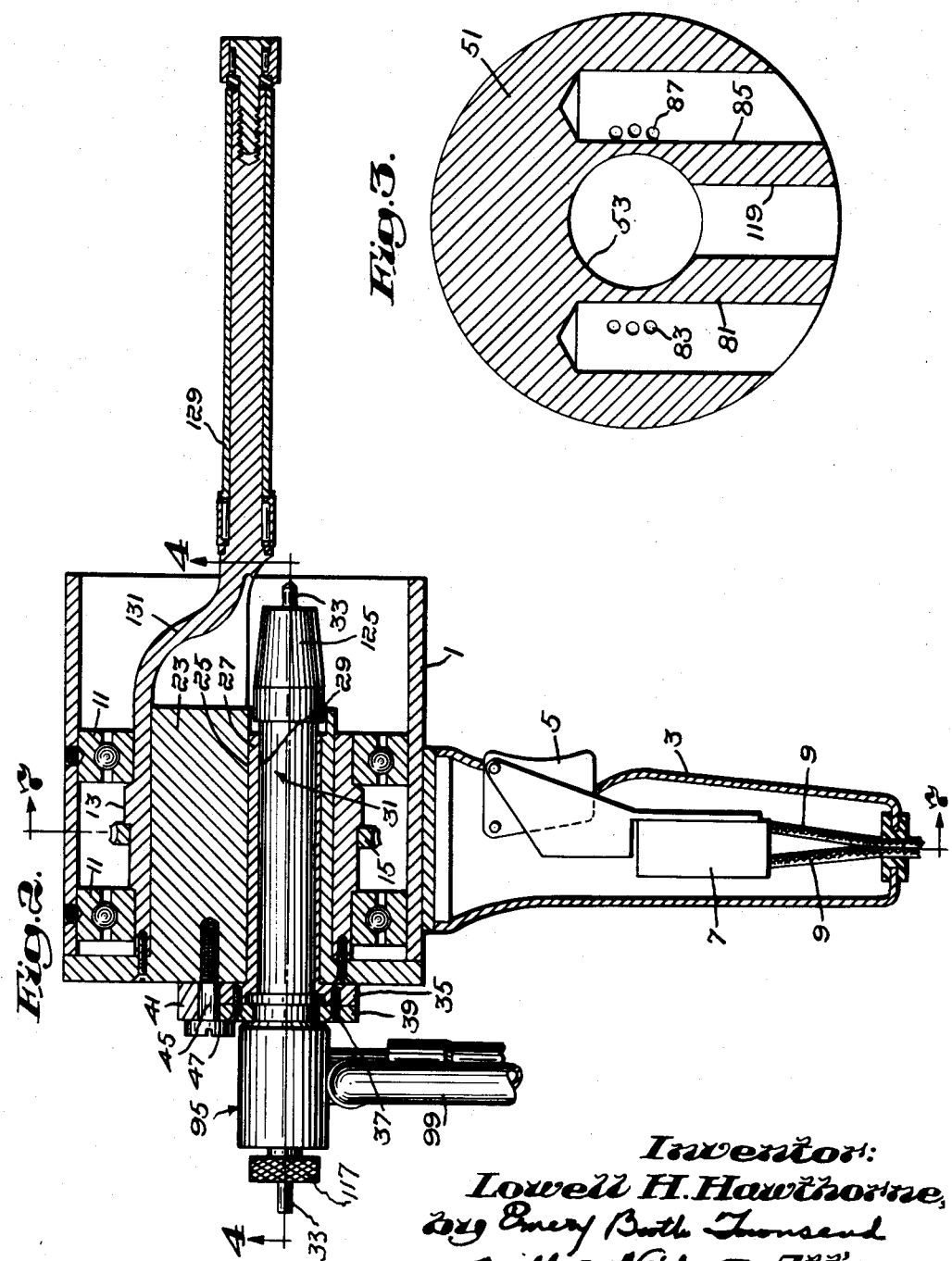
Inventor:
Lowell H. Hawthorne

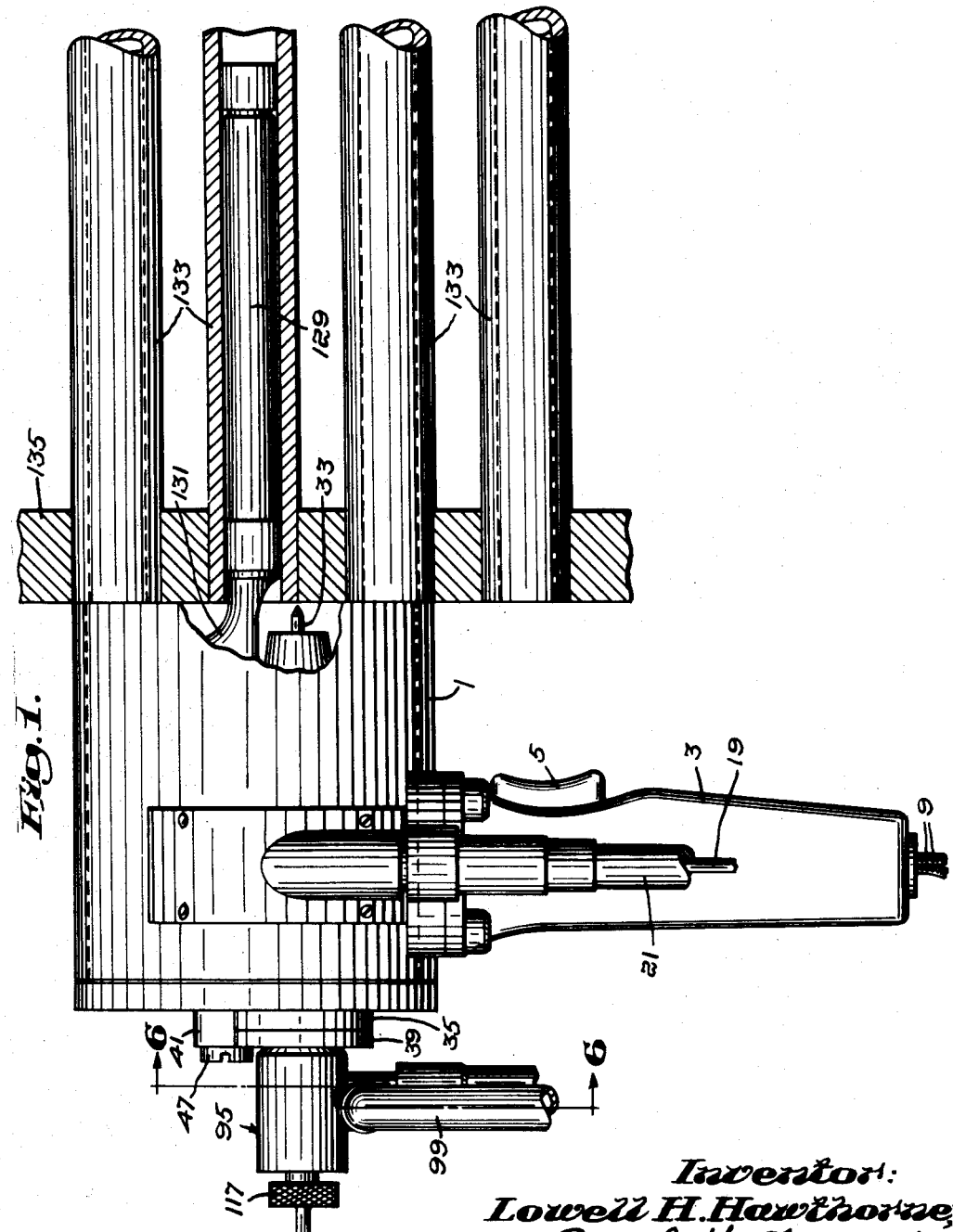

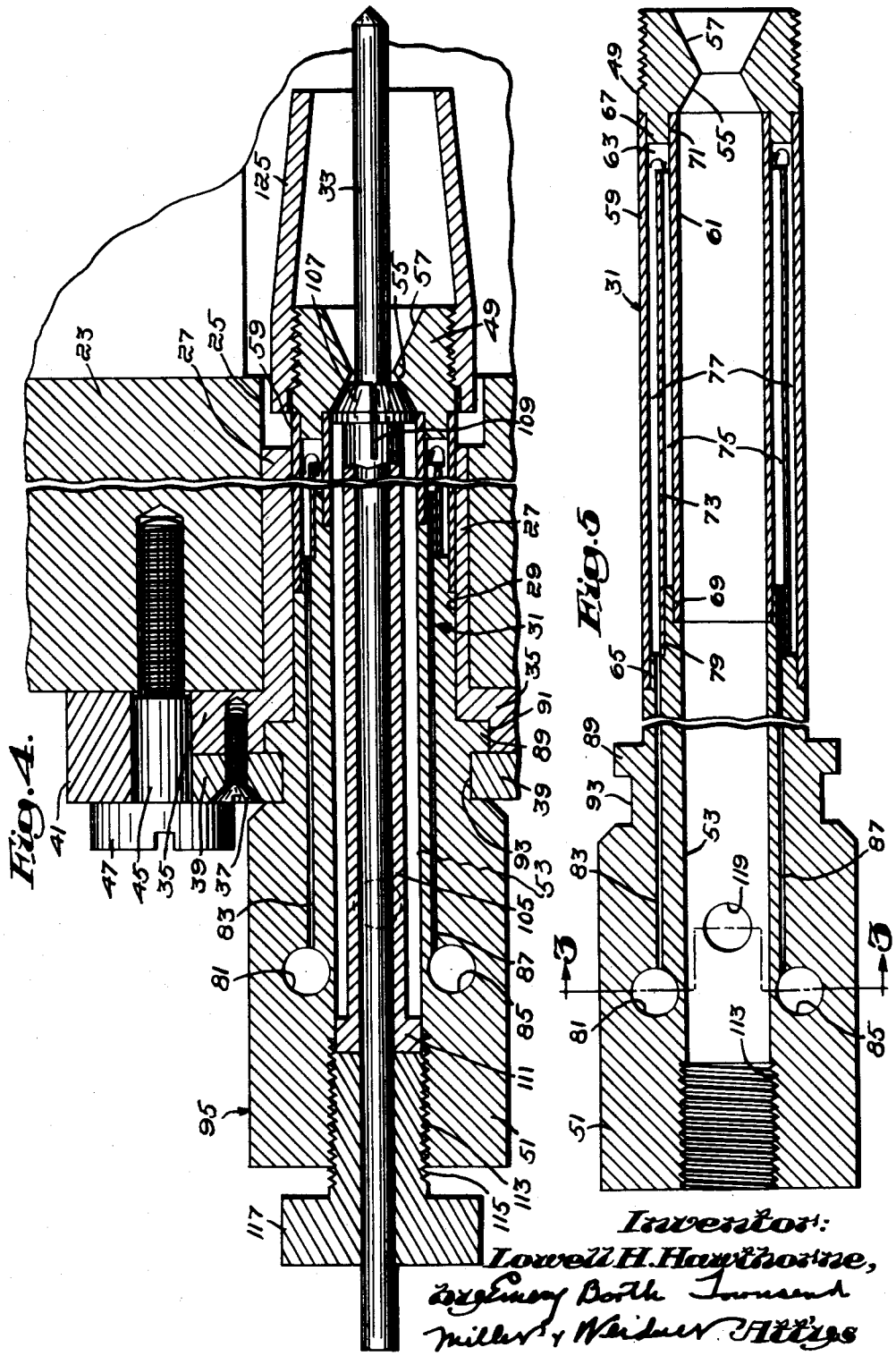

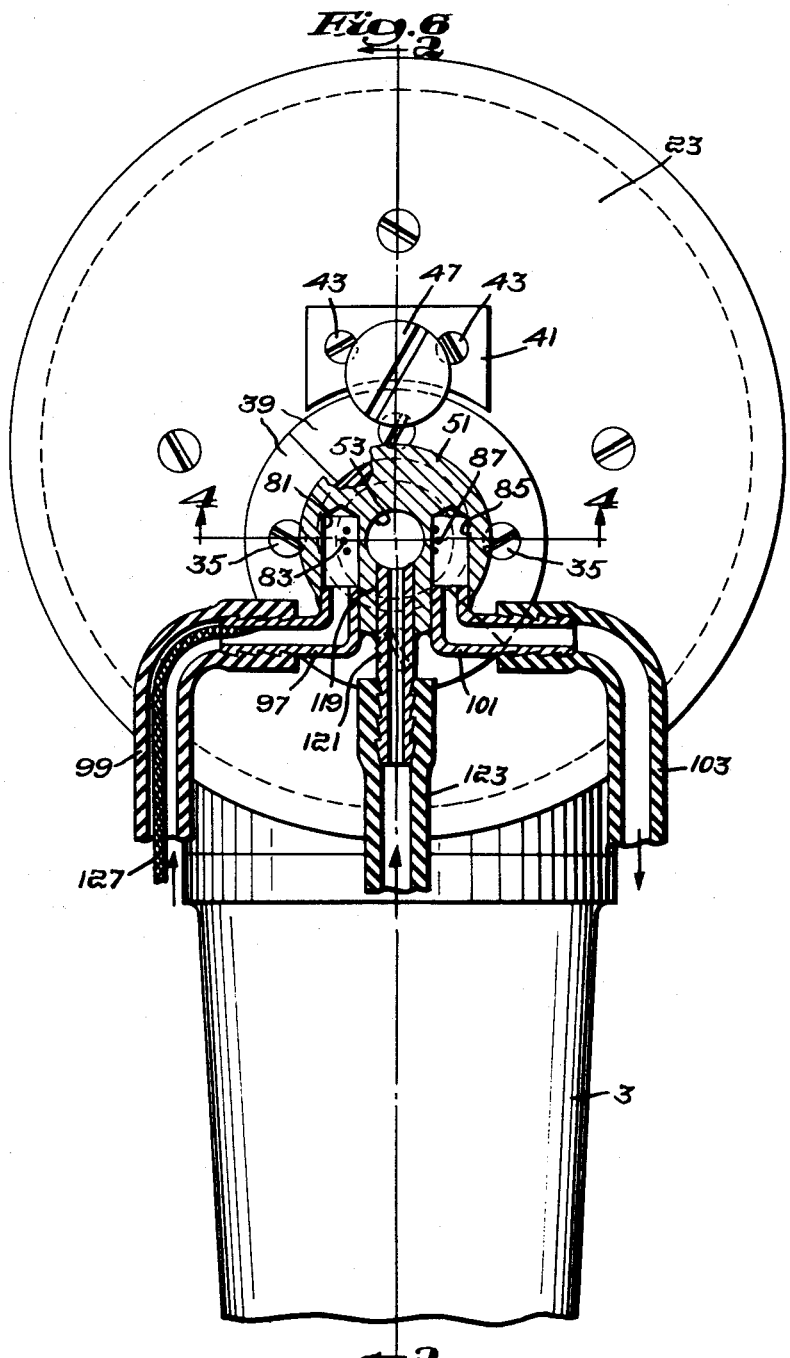

May 24, 1960
L. H. HAWTHORNE
2,938,106
WELDING GUNS
Filed Nov. 14, 1957
5 Sheets-Sheet 5
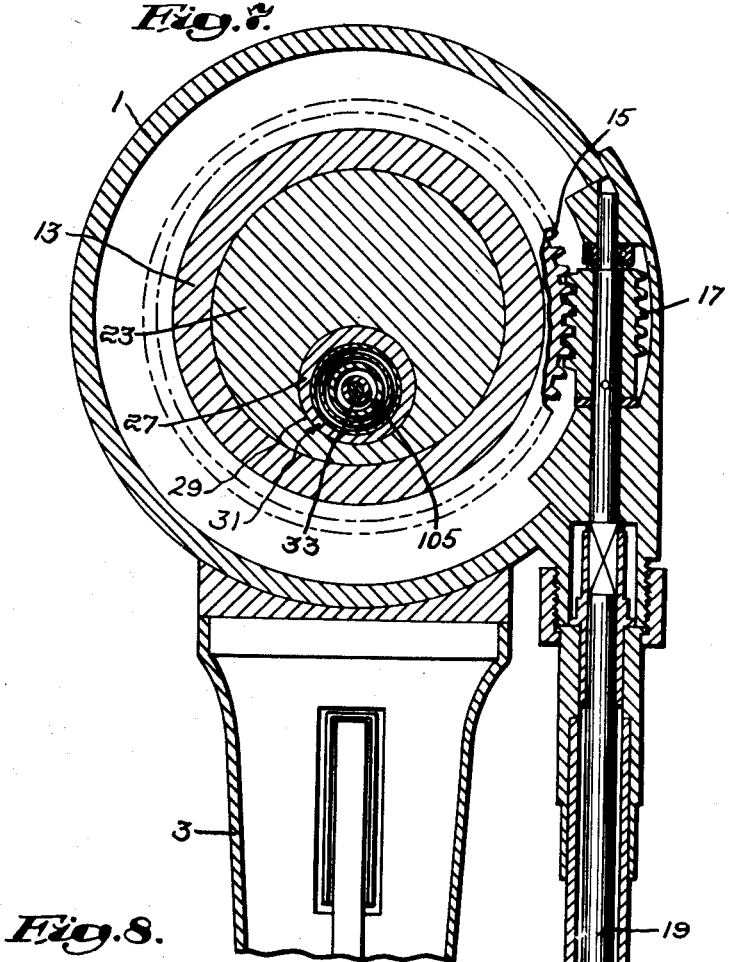
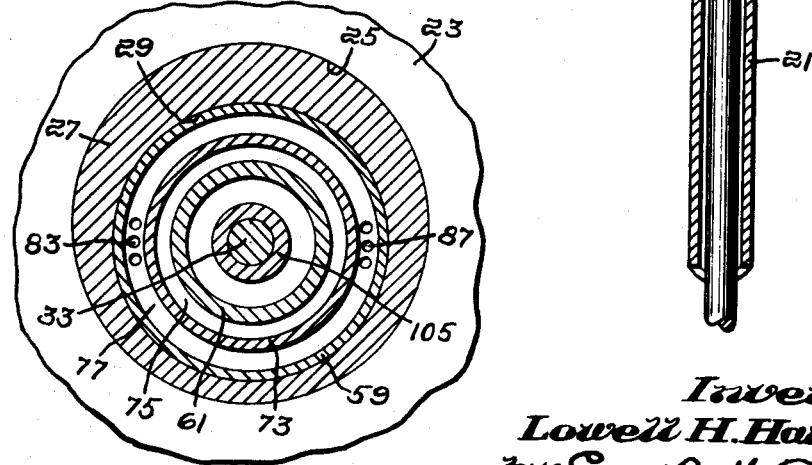
Inventor:
Lowell H. Hawthorne

United States Patent Office 2,938,106
Patented May 24, 1960

2,938,106

WELDING GUN

Lowell H. Hawthorne, Verona, N.Y., assignor to Revere Copper and Brass Incorporated, Rome, N.Y., a corporation of Maryland Filed Nov. 14, 1957, Ser. No. 696,369

4 Claims. (Cl. 219—125)

My invention relates to welding guns, particularly but not exclusively to one for fusion arc welding tubes to tube sheets.

The invention, which constitutes an improvement on the welding gun disclosed by applicant's co-pending application Serial Number 619,308, filed October 30, 1956, and has among its objects improved cooling means for the gun, will be best understood from the following description when read in the light of the accompanying drawings of an embodiment of the invention selected for illustrative purposes, while the scope of the invention will be more particularly pointed out in the appended claims.

In the drawings:

Fig. 1 is a side elevation, with parts in section, of a welding gun according to the invention applied to a tube sheet for welding a tube thereto;

Fig. 2 is a section on the line 2—2 of Fig. 6 on a reduced scale, with parts in elevation;

Fig. 3 is a section on the line 3—3 of Fig. 5 on an enlarged scale;

Fig. 4 is a fragmentary section, with parts broken away, on the line 4—4 of Fig. 2 on an enlarged scale, the section line 4—4 also being added to Fig. 6 for convenience in following the drawings;

Fig. 5 is a detail of parts shown by Fig. 4;

Fig. 6 is a section on the line 6—6 of Fig. 1;

Fig. 7 is a section on the line 7—7 of Fig. 2, with parts in elevation; and

Fig. 8 shows a fragment of Fig. 7 on an enlarged scale.

The welding gun illustrated by the drawings, in common with that illustrated by the drawings of applicant's hereinbefore mentioned pending application, comprises a metallic sleeve-like support 1 rigidly carrying a radially projecting handle 3 to be grasped by the operator for holding the support against rotation when the gun is in operation, and for manipulating the gun. As shown, the handle carries a trigger 5 adapted to be momentarily depressed by the operator for actuating a switch 7 housed by the handle for momentarily establishing a circuit through the leads 9 which run to the control apparatus for causing the gun to perform its cycle of operations in welding the tube to the tube sheet.

In common with the gun described by applicant's hereinbefore mentioned pending application, rotatably mounted within the sleeve-like support 1 on anti-friction bearings 11 is a metallic sleeve 13, these bearings being so constructed as to hold that sleeve against longitudinal movement relative to the support. For rotating this sleeve it is shown as fixedly carrying a wormwheel 15 with which meshes a worm 17 that is rotatably carried by the support and is driven by a flexible cable 19 housed within the flexible tube 21 connected at one end to the support. The cable 19 itself is driven by a motor (not shown) forming part of the control apparatus.

Within and rotatable with the sleeve 13 is shown a cylindrical block 23 preferably of electric insulating material. This block is shown as provided with a through bore 25 (Figs. 2, 4 and 8) which rotatably receives a sleeve 27. The sleeve 27 itself has an eccentric bore 29 which rotatably receives the barrel 31 of the gun. Extending through the barrel axially thereof is shown a non-consumable electrode 33. At its rearward end the sleeve 27 is shown as integrally formed with an exterior collar 35 which rests against the rearward end face of the block 23. Carried by the collar 35 at its rearward side, and secured thereto by screws 37, is a second collar formed of the two segments 39 (Figs. 2 and 6), the collar 35 and these two segments in effect forming one collar. Cooperating with the circumferential edge of the collar so formed is a metal block 41 secured to the block 23 by screws 43. Extending through the block 41, and tapped into the block 23, is a screw 45 having a fillister head 47 (Figs. 2 and 6) which overlies the block 41 and the collar comprising the segments 39 in contacting relation with their outer sides. Normally the screw 45 holds the sleeve 27 in non-rotative fixed relation to the block 23. However, by loosening the screw the sleeve may be rotated relative to the block 23 so as adjustably to position the axis of the barrel of the gun and the electrode carried thereby radially relative to the axis of rotation of that block.

As best shown in Figs. 4 and 5, the barrel 31 which carries the electrode 33 comprises a forward head 49 and a rearward head 51. The rearward head is shown as provided with an axial through bore 53, while the forward head is shown as provided with a through bore comprising the communicating rearwardly flaring portion 55 and forwardly flaring portion 57. Connecting the rearward head to the forward head is shown an outer cylindrical tube 59 and an inner cylindrical tube 61, the walls of which tubes are in spaced relation to provide an annular space 63 between them. For so connecting the heads the forward end portion of the rearward head is shown as formed with a reduced diameter portion 65 over which the rearward end portion of the outer tube 59 fits, while the rearward end portion of the forward head is shown as formed with a reduced diameter portion 67 over which the forward end portion of the outer tube fits. Further, the forward end of the bore 53 of the rearward head is shown as formed with an enlarged diameter portion 69 which receives and fits the rearward end portion of the inner tube 61, while the rearward end of the bore of the forward head is shown as formed with an enlarged diameter portion 71 which receives and fits the forward end portion of the inner tube. These end portions of the inner and outer tubes where they fit the rearward and forward heads are secured to said heads, preferably by brazing, so as to form a rigid structure.

Within the annular space 63 between the inner and outer tubes 61 and 59 is shown a third tube 73 which is spaced from both the inner and outer tubes so as to divide said annular space into two annular spaces 75 and 77 lying at opposite sides, respectively, of said third tube. As shown, the forward end portion of the rearward head 51 is provided with a reduced diameter portion 79 over which the rearward end portion of the third tube fits and is secured thereto preferably by brazing. The third tube, as shown, terminates short of the rearward end of the forward head 49 so that the portion of the annular space 63 adjacent the forward head places the forward ends of the two annular spaces 75 and 77 in fluid communication.

As shown, the rearward head is formed with a transversely extending bore or passage 81 (Figs. 3, 4 and 5) opening at one end on its exterior. Leading from this bore 81 to the rearward end of the annular space 77 are shown a plurality of parallel passages 83 formed in the rearward head. At the side of the rearward head diametrically opposite the bore or passage 81 that head is shown as formed with a like transversely extending bore or passage 85. Leading from this bore 85 to the rearward end of the annular space 75 are shown a plurality of parallel passages 87 formed in the rearward head.

As best shown in Figs. 4 and 5, the rearward head 51 of the barrel 31 of the gun is formed adjacent its forward end with an outwardly projecting annular flange 89 which is rotatably received in an annular recess 91 formed in the sleeve 27 at the rearward end portion of its bore, in which recess it is retained by the collar formed by the two segments 39. These segments fit in an annular recess 93 formed on the exterior of the rearward head adjacent the annular flange 89 thereof. By this construction when the screws 37 are in place the barrel of the gun is rotatably retained in the sleeve 27 but held against longitudinal movement relative to that sleeve, the construction also providing that the portion of the rearward head at the left of the collar formed by the segments 39, as viewed in Figs. 1 and 2, presents a barrel portion 95 projecting rearwardly from the sleeve-like support 1 and the block 23 rotatably received by such support.

The transverse bores or passages 81 and 85 of the rearward head 51 of the barrel of the gun are positioned in the above mentioned rearwardly projecting barrel portion 95. Received in the open end portion of the bore or passage 81, and secured thereto preferably by welding or brazing, is, as shown, one end of an angle nipple 97 (Fig. 6), the opposite end of this nipple being connected to a flexible rubber hose 99. A second angle nipple 101 is shown as inserted in, and similarly secured to, the open end portion of the bore or passage 85, to the opposite end of which nipple is secured the end portion of a flexible rubber hose 103. By connecting the hose 99 to a source of cooling water under pressure cooling water will flow through the bore or passage 81 and passages 83 into the annular space 77 surrounding the tube 73 to adjacent the forward head of the gun, hence through the annular space 75 enclosed by said tube and through the passages 87 to the bore or passage 85, which latter will discharge the water into the hose 103 leading to a suitable source of water disposal.

As shown, the electrode 33 slidably extends through and fits the bore of a sleeve-like member 105, which latter extends axially through the barrel from its rearward head to its forward head. At its forward end this sleeve-like member is shown as formed with a head 107 having an outer, forwardly tapering, frusto-conical surface adapted to fit the frusto-conical surface presented by the rearwardly flaring bore portion 55 of the forward head 49 of the barrel of the gun. The head 107 and the adjacent portion of the member 105 are formed with a plurality of longitudinally extending spaced slits 109 angularly dividing the head into a plurality of resiliently supported jaws which are adapted to grip the electrode when the member is pressed forwardly to cause the frusto-conical surface presented by said bore portion 55 to press the jaws radially inward. As shown, the member 105 at its rearward end is provided with a head 111 which slidably fits the central bore of the rearward head 51. The rearward end portion of this bore is shown as screw-threaded, as indicated at 113, and screw-threadedly receives the screw-threaded shank 115 of a member having a knurled head 117 at the rear of the rearward head, the electrode extending through this member to the rear of said head. In an obvious manner, by gripping the head 117 the operator may rotate the member of which it forms a part to force the member 105 forwardly to cause the electrode gripping jaws to grip the electrode, these jaws releasing the electrode when said head is rotated to remove the pressure on the member 105 urging it forwardly. In this way the electrode may be adjusted longitudinally relative to the barrel of the gun.

As shown, the rearward head of the gun is formed with a bore or passage 119 (Figs. 3 and 6) connecting the central bore 53 of the rearward head to the exterior of such head. This bore 119 is shown as receiving one end of a nipple 121 secured therein by welding or brazing, the opposite end of which nipple is connected to a flexible rubber hose 123 leading to a source of shielding gas supply under pressure. Such gas when conducted through the hose and nipple to the bore 53 will flow through that bore and the tube 61 to the forward end portion of that tube from which it will discharge through the slits 109 of the member 105 into the forwardly flaring portion 57 of the bore of the forward head for discharge into a sleeve-like nozzle 125 carried by and projecting forwardly of the forward head in concentric surrounding relation to the electrode. From the nozzle the gas discharges as an annular stream surrounding the electrode and the arc struck by it for shielding the arc and the portion of the work struck by the arc.

For supplying the electrode with welding current there is shown a flexible electric cable 127 extending through the flexible water hose 99 and welded or brazed at its end to the nipple 97. This cable extends to the control apparatus for the gun where it is supplied with welding current. As the nipple 97 is in electrical communication with the metallic barrel of the gun, and the member 105 having the jaws which grip the electrode is in electrical communication with both said barrel and the electrode, the electrode will be effectively supplied with welding current from the cable 127.

It will be understood that by the construction above described, although the barrel of the gun and the electrode will be rotated bodily about the axis of the block 23 when the latter is rotated, said barrel will not axially rotate because of the resistance to its axial rotation exerted by the hoses 99, 103 and 123. Thus these hoses are prevented from twisting when the electrode is being rotated about the axial line of the block 23.

As further shown, the gun comprises a forwardly projecting mandrel 129, the rearward end of which mandrel is connected by a part 131 to the forward end of the rotary sleeve 13 which carries the block 23. This mandrel is adapted to be inserted in the bore of the tube 133 (Fig. 1) to be welded to the tube sheet 135, the mandrel rotatably fitting the tube so as to register the axis of rotation of said sleeve and block with the axial line of the tube and thus position the electrode at such proper radial distance from said axial line as is necessary for the arc to weld the joint between the tube and tube sheet as the electrode is bodily rotated circumferentially about such joint. At the same time the forward edge portion of the sleeve-like support 1 rests against the tube sheet so as to position the tip of the electrode in proper spaced relation to the joint longitudinally of the axial line of the tube.

It will be understood that within the scope of the appended claims wide deviations may be made from the form of the invention herein described without departing from the spirit of the invention.

I claim:

1. A welding gun having an elongate generally cylindrical manual support, a longitudinal carrier element rotatable in the support, said support having mounted therein an elongate gun barrel which comprises a longitudinally projecting rearward head and a forward head, each of which heads is formed with a longitudinally extending bore; an outer tube, an inner tube within said outer tube, the walls of said tubes being in spaced relation to provide an annular space between them, the inner tube connecting said bores of said heads, said heads and tubes being of separate fabrication and each of said tubes at its opposite ends being directly and rigidly secured to said rearward head and forward head, respectively; a third tube which is positioned in said annular space with its wall in spaced relation to each of the two first mentioned tubes and is carried at one end by said rearward head and has its opposite end in spaced relation to said forward head, whereby to divide said annular space into two annular spaces communicating with each other adjacent said forward head; a forwardly projecting sleeve-like nozzle carried by said forward head; an electrode extending through the bores of said heads, inner tube and nozzle; means for discharging a shielding gas through said nozzle; said rearward head having provision for connecting thereto a water supply conduit and a water discharge conduit, and being formed with passages for conducting water from such water supply conduit to the rearward end portion of one of said two annular spaces and for conducting water from the rearward end portion of the other of said two annular spaces to such water discharge conduit.

2. A welding gun having an elongate generally cylindrical manual support, a longitudinal carrier element rotatable in the support, said support having mounted therein an elongate gun barrel which comprises a longitudinally projecting rearward head and a forward head, each of which heads is formed with a longitudinally extending bore; an outer tube, an inner tube within said outer tube, the walls of said tubes being in spaced relation to provide an annular space between them, the inner tube connecting said bores of said heads, said heads and tubes being of separate fabrication and each of said tubes at its opposite ends being directly and rigidly secured to said rearward head and forward head, respectively; a third tube which is positioned in said annular space with its wall in spaced relation to each of the two first mentioned tubes and is carried at one end by said rearward head and has its opposite end in spaced relation to said forward head, whereby to divide said annular space into two annular spaces communicating with each other adjacent said forward head; a forwardly projecting sleeve-like nozzle carried by said forward head; an electrode extending through the bores of said heads, inner tube and nozzle; means within said inner tube cooperating with said forward head for clamping said electrode in adjusted positions longitudinally of said barrel; means for discharging a shielding gas through said inner tube and thence past said clamping means into said nozzle; said rearward head having provision for connecting thereto a water supply conduit and a water discharge conduit, and being formed with passages for conducting water from such water supply conduit to the rearward end portion of one of said two annular spaces and for conducting water from the rearward end portion of the other of said two annular spaces to such water discharge conduit.

3. A welding gun having an elongate generally cylindrical manual support, a longitudinal carrier element rotatable in the support, said support having mounted therein an elongate gun barrel which comprises a longitudinally projecting rearward head and a forward head, each of which heads is formed with a longitudinally extending bore; an outer tube, an inner tube within said outer tube, the walls of said tubes being in spaced relation to provide an annular space between them, the inner tube connecting said bores of said heads, said heads and tubes being of separate fabrication and each of said tubes at its opposite ends being directly and rigidly secured to said rearward head and forward head, respectively; a third tube which is positioned in said annular space with its wall in spaced relation to each of the two first mentioned tubes and is carried at one end by said rearward head and has its opposite end in spaced relation to said forward head, whereby to divide said annular space into two annular spaces communicating with each other adjacent said forward head; a forwardly projecting sleeve-like nozzle carried by said forward head; an electrode extending through the bores of said heads, inner tube and nozzle; said rearward head having provision for connecting thereto a gas supply conduit, and being formed with a passage adapted to conduct gas from such conduit to the bore of such head for discharge through said nozzle by way of the bore of said inner tube; said rearward head also having provision for connecting thereto a water supply conduit and a water discharge conduit, and being formed with passages for conducting water from such water supply conduit to the rearward end portion of one of said two annular spaces and for conducting water from the rearward end portion of the other of said two annular spaces to such water discharge conduit.

4. A welding gun having an elongate generally cylindrical manual support, a longitudinal carrier element rotatable in the support, said support having mounted therein an elongate gun barrel which comprises a longitudinally projecting rearward head and a forward head, each of which heads is formed with a longitudinally extending bore; an outer tube, an inner tube within said outer tube, the walls of said tubes being in spaced relation to provide an annular space between them, the inner tube connecting said bores of said heads, said heads and tubes being of separate fabrication and each of said tubes at its opposite ends being directly and rigidly secured to said rearward head and forward head, respectively; a third tube which is positioned in said annular space with its wall in spaced relation to each of the two first mentioned tubes and is carried at one end by said rearward head and has its opposite end in spaced relation to said forward head, whereby to divide said annular space into two annular spaces communicating with each other adjacent said forward head; a forwardly projecting sleeve-like nozzle carried by said forward head; an electrode extending through the bores of said heads, inner tube and nozzle; clamping means cooperating with said forward head for holding said electrode in adjusted positions longitudinally of said barrel, which means comprises spaced clamping jaws and means cooperating with said rearward head for operating said jaws; means for admitting a shielding gas to said inner tube for discharge through the spaces between said jaws into said nozzle comprising a passage in said rearward head connected to the bore of said inner tube, said rearward head having provision for connecting thereto a gas supply conduit for discharging gas into such passage; said rearward head also having provision for connecting thereto a water supply conduit and a water discharge conduit, and being formed with passages for conducting water from such water supply conduit to the rearward end portion of one of said two annular spaces and for conducting water from the rearward end portion of the other of said two annular spaces to such water discharge conduit.

References Cited in the file of this patent

UNITED STATES PATENTS

| | | |
|---|---|---|
| 2,468,807 | Herbst | May 3, 1949 |
| 2,527,235 | Tuthill | Oct. 24, 1950 |
| 2,554,236 | Bernard | May 22, 1951 |
| 2,768,279 | Rava | Oct. 23, 1956 |
| 2,784,294 | Gravert | Mar. 5, 1957 |
| 2,834,870 | Platte | May 13, 1958 |